United States Patent [19]
Schmaling et al.

[11] Patent Number: 5,954,480
[45] Date of Patent: *Sep. 21, 1999

[54] VIBRATION ISOLATOR FOR ROTORCRAFT

[75] Inventors: David N. Schmaling, Southbury; Frederick J. Miner, Barkhamsted; Albert T. Krauss, Harwinton; Kirk C. Frederickson, Seymour, all of Conn.

[73] Assignee: Sikorsky Aircraft Corporation, Stratford, Conn.

[ * ] Notice: This patent is subject to a terminal disclaimer.

[21] Appl. No.: 08/919,928

[22] Filed: Aug. 28, 1997

[51] Int. Cl.$^6$ .............................. B64C 27/06; B64C 27/32
[52] U.S. Cl. .............................. 416/145; 416/500; 74/574
[58] Field of Search ...................................... 416/144, 145, 416/500, 106, 107, 140, 244 R, 245 R; 188/379, 380; 267/140.5; 464/51, 100, 180; 74/572, 573 R, 574

[56] References Cited

U.S. PATENT DOCUMENTS

| | | |
|---|---|---|
| 1,803,937 | 5/1931 | Jansson . |
| 2,473,335 | 6/1949 | Hardy . |
| 3,540,809 | 11/1970 | Paul et al. . |
| 3,603,172 | 9/1971 | Hall . |
| 3,910,720 | 10/1975 | Vincent et al. ........................ 416/145 |
| 4,046,230 | 9/1977 | Troyer . |
| 4,057,363 | 11/1977 | Kenigsberg et al. . |
| 4,083,654 | 4/1978 | Kenigsberg et al. . |
| 4,145,936 | 3/1979 | Vincent et al. . |
| 4,212,588 | 7/1980 | Frandenburgh ..................... 416/245 R |
| 4,225,287 | 9/1980 | Vincent et al. . |
| 4,596,513 | 6/1986 | Carlson et al. . |
| 5,372,478 | 12/1994 | McCafferty ............................ 416/106 |
| 5,647,726 | 7/1997 | Sehgal et al. ......................... 415/145 |

*Primary Examiner*—Christopher Verdier
*Attorney, Agent, or Firm*—Brian A. Collins

[57] ABSTRACT

A vibration isolator (20) operative for reducing vibration active on a main rotor (12) of a rotorcraft. The vibration isolator (20) includes a hub attachment fitting (22) secured in combination with the main rotor (12) and a spring-mass system (24) mounting to and rotating with the hub attachment fitting (22). The vibration isolator (20) is characterized by the spring-mass system (24) having a fairing (44) operative to aerodynamically contour the spring-mass system (24) while providing a portion of the working mass thereof. Other features of the vibration isolator include adapting the hub attachment fitting (22) to accept hub-mounted rotor systems (36), provide access to the rotor hub mounting attachment (34), and provide a motion limiting portion (74) for reducing loads acting on the spring-mass system (24).

19 Claims, 5 Drawing Sheets

VIBRATION ISOLATOR FOR ROTORCRAFT

TECHNICAL FIELD

This invention is directed to vibration isolators, and, more particularly, to a mast-mounted vibration isolator for rotorcraft which, inter alia, eliminates the parasitic weight of conventional rotor head fairings, reduces aerodynamic drag, and improves the handling qualities of the rotorcraft.

BACKGROUND OF THE INVENTION

Mast-mounted vibration isolators are well-known in the art for canceling or substantially reducing vibratory forces active on a helicopter rotor. While most such devices are referred to as "vibration absorbers", this may be viewed as a misnomer inasmuch as these devices typically isolate the energy produced by cyclic in-plane and out-of-plane loads rather than absorb the energy as the name implies. Such devices typically include: a hub attachment fitting for mounting to the main rotor hub such that the isolator is rotated in a plane parallel to the main rotor disc, and a spring-mass system mounted to and rotating with the hub member. The spring-mass system is tuned in the non-rotating condition to a frequency equal to N*rotor RPM (e.g., 4P for a four-bladed rotor) at normal operating speed, so that in the rotating condition it will respond to both N+1 and N−1 frequency vibrations (3P and 5P).

Vincent el al. U.S. Pat. Nos. 4,145,936 and 4,225,287 disclose mast-mounted vibration isolators having a plurality of resilient arms (i.e., springs) extending in a spaced-apart spiral pattern between a hub attachment fitting and a ring-shaped mass. More specifically, the hub attachment fitting is typically a solid block mounting to and rotating with the helicopter main rotor hub. At least three pairs of spiral springs (3 upper and 3 lower) are equiangularly arranged with respect to both the hub attachment fitting and the ring-shaped mass so as to produce substantially symmetric spring stiffness in an in-plane direction. Each spring is comprised of unidirectional fiberglass so as to provide low in-plane bending stiffness and superior fatigue properties. The ring-shaped mass is typically comprised of three segments which include a central ring and a pair of ring-shaped plates mounted in combination therewith so as to produce a substantially C-shaped cross-section. As such, the ring-shaped plates stiffen the central ring to obviate distortion and the adverse consequences of higher harmonic dynamic resonances.

While the teachings disclosed in the '936 and '287 patents provide a baseline for design and development, the isolators described therein are disadvantageous for various reasons. Firstly, the mounting of such isolators to the main rotor hub produces difficulties with respect to periodic inspection and maintenance of the rotor hub attachment, i.e., the structural connection between the main rotor hub and the main rotor drive shaft. Insofar as such structural connection is commonly checked and/or tightened following each flight, it is necessary to remove such isolators to perform inspection and maintenance. As such, it will be appreciated that the assembly/disassembly of the isolator with each flight adversely impacts the direct maintenance costs of the rotorcraft. Secondly, the configuration of such isolators does not accommodate various systems which extend up and/or through the main rotor shaft. For example, the distributor and wiring harnesses of a rotor blade de-ice system must be routed beneath or around the isolator rather than being centrally located above the main rotor hub or the isolator itself. Thirdly, the relatively large profile area and blunt configuration of such isolators produces high aerodynamic drag which adversely impacts rotorcraft performance and fuel consumption. Finally, the turbulent airflow produced by such isolators can adversely affect the handling qualities of the rotorcraft. For example, such turbulent airflow may, in certain flight regimes, impose undesirable vibratory loads on the tail pylon and produce objectionable vibration.

With respect to the latter issues associated with aerodynamic drag and handling qualities, it is known in the art to employ aerodynamic fairings over such vibration isolators to reduce aerodynamic drag penalties, reduce airflow turbulence and alter the course of the airflow downstream of the isolator. While such aerodynamic fairings substantially improve the performance and handling qualities of the rotorcraft, such fairings are parasitic in weight and cost.

A need, therefore, exists for a vibration isolator which eliminates the parasitic weight of a conventional rotor head fairing, minimizes aerodynamic drag, improves rotorcraft handling qualities, facilitates periodic inspection and maintenance of the main rotor hub attachment, and accommodates the mounting of various hub-mounted rotor systems.

SUMMARY OF THE INVENTION

It is an object of the present invention to provide a vibration isolator for rotorcraft which eliminates the parasitic weight of a conventional rotor head fairing.

It is another object of the present invention to provide such a vibration isolator which minimizes aerodynamic drag.

It is yet another object of the present invention to provide such a vibration isolator which improves the handling qualities of the rotorcraft.

It is still a further object of the invention to provide such a vibration isolator which facilitates periodic inspection and maintenance of the main rotor hub attachment.

It is still another object of the invention to provide such a vibration isolator which accommodates the mounting of various hub-mounted systems such as a rotor blade de-ice system.

These and other objects are achieved by a vibration isolator operative for reducing vibration active on a main rotor of a rotorcraft. The vibration isolator includes a hub attachment fitting secured in combination with the main rotor and a spring-mass system mounting to and rotating with the hub attachment fitting. The vibration isolator is characterized by the spring-mass system having a fairing operative to aerodynamically contour the spring-mass system while providing a portion of the working mass thereof. Other features of the vibration isolator include adapting the hub attachment fitting to accept hub-mounted rotor systems, provide access to the rotor hub mounting attachment, and provide a motion limiting means for reducing loads acting on the spring-mass system.

BRIEF DESCRIPTION OF THE DRAWINGS

A more complete understanding of the present invention and the attendant features and advantages thereof may be had by reference to the following detailed description of the invention when considered in conjunction with the following drawings wherein.

BEST MODE FOR CARRYING OUT THE INVENTION

Figure 1:
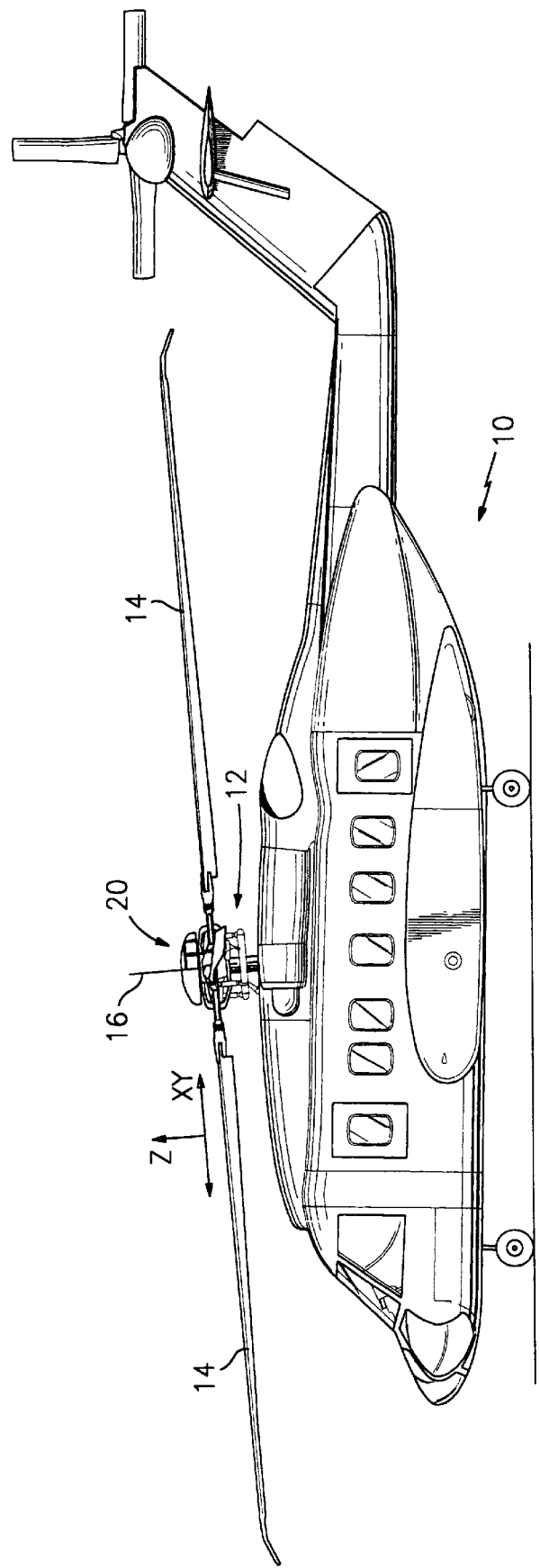
FIG. 1 is a profile view of a rotorcraft illustrating an exemplary installation of a vibration isolator according to the present invention.

Referring now to the drawings wherein like reference characters identify corresponding or similar elements throughout the several views, FIG. 1 shows a helicopter 10 having a main rotor 12 for driving a plurality of rotor blades 14 about an axis of rotation 16, and a vibration isolator 20 according to the present invention mounting in combination with the main rotor 12. The vibration isolator is operative to cancel or substantially reduce in-plane vibrations active on the main rotor 12, i.e., along the X-Y plane of the reference coordinate system, and is tuned to a frequency corresponding to $N*RPM_{ROTOR}$ where N is the number of rotor blades 14 and the RPM is the rotational speed of the main rotor 12.

Figure 2:
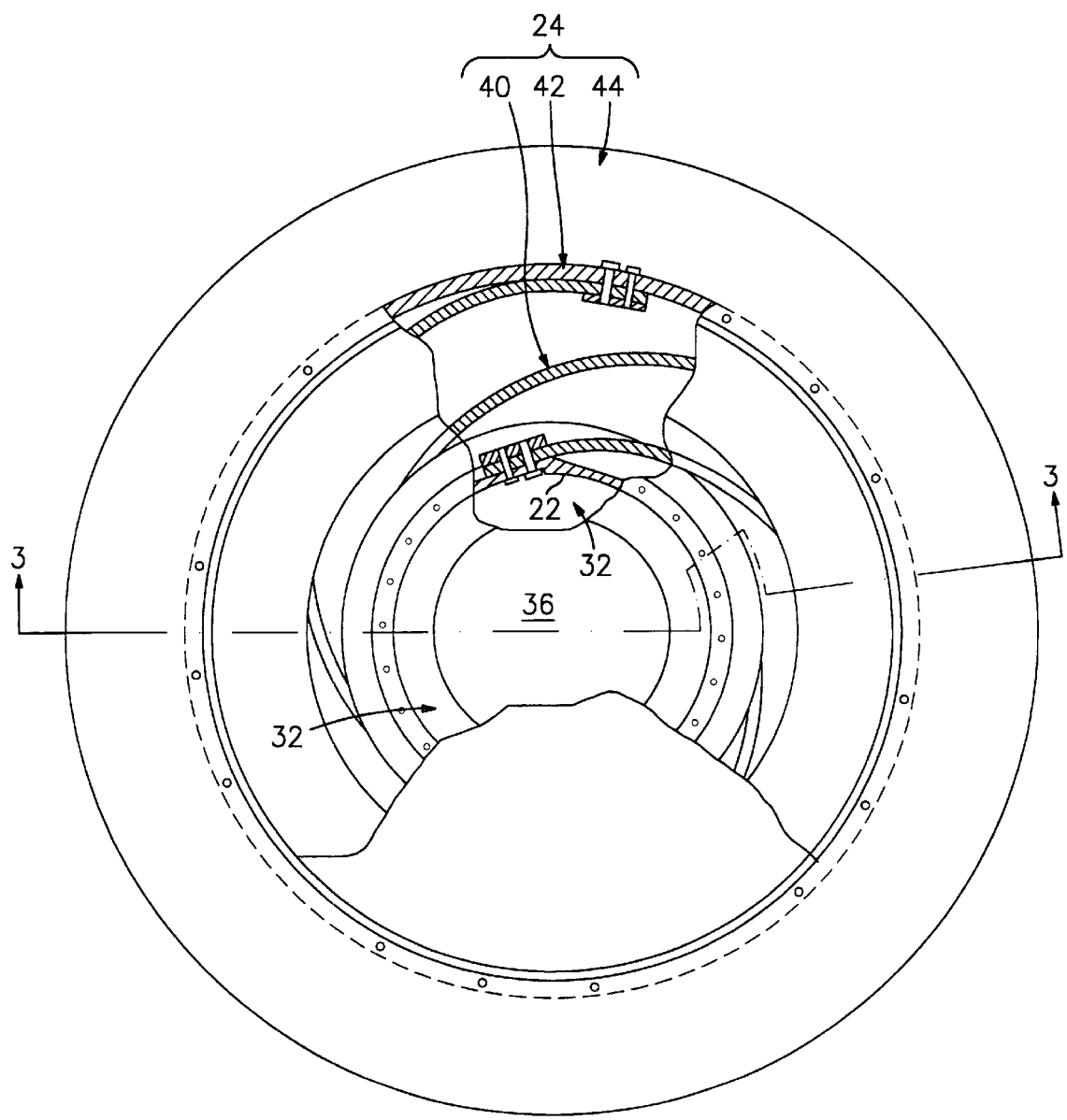
FIG. 2 is a partially broken-away top view of the vibration isolator.

In FIGS. 2 though 4, the vibration isolator comprises a hub attachment fitting 22 and a spring-mass system 24 mounting to and rotating with the hub attachment fitting 22. More specifically, the hub attachment fitting 22 is generally configured in the shape of a cup or drum and includes an inwardly facing flange 28 (see FIG. 3) for mounting in combination with the main rotor hub 30 of the main rotor 12. The hub attachment fitting 22 defines an internal chamber 32 which accommodates the mounting of a rotor de-ice system 36 and which surrounds a mounting means 34 (not shown in FIG. 2) for coupling the hub 30 to the main rotor shaft 38. The import of such arrangement will be discussed in subsequent paragraphs.

Figure 3:
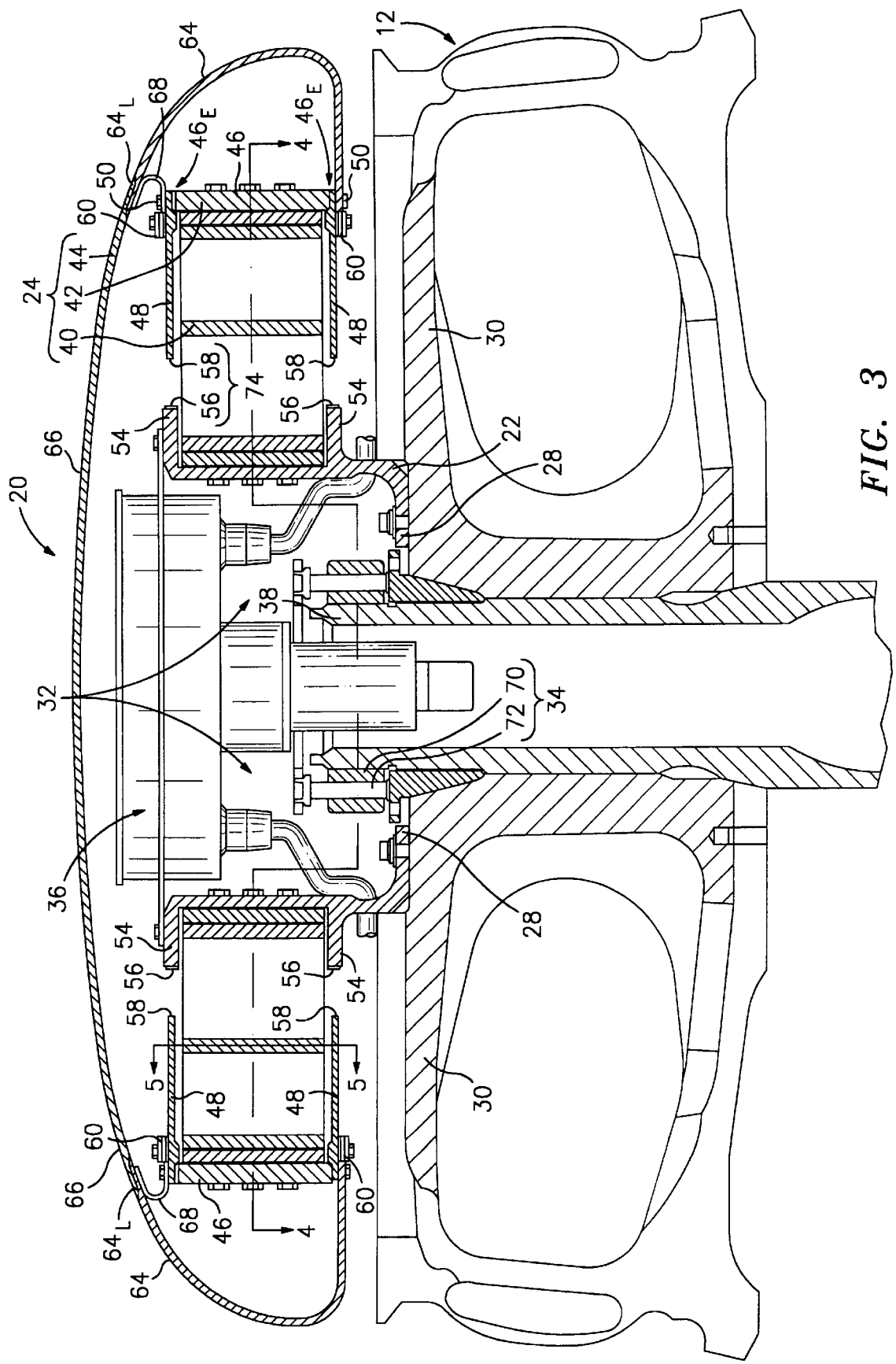
FIG. 3 is a cross-sectional view taken substantially along line 3—3 of FIG. 2.
Figure 4:
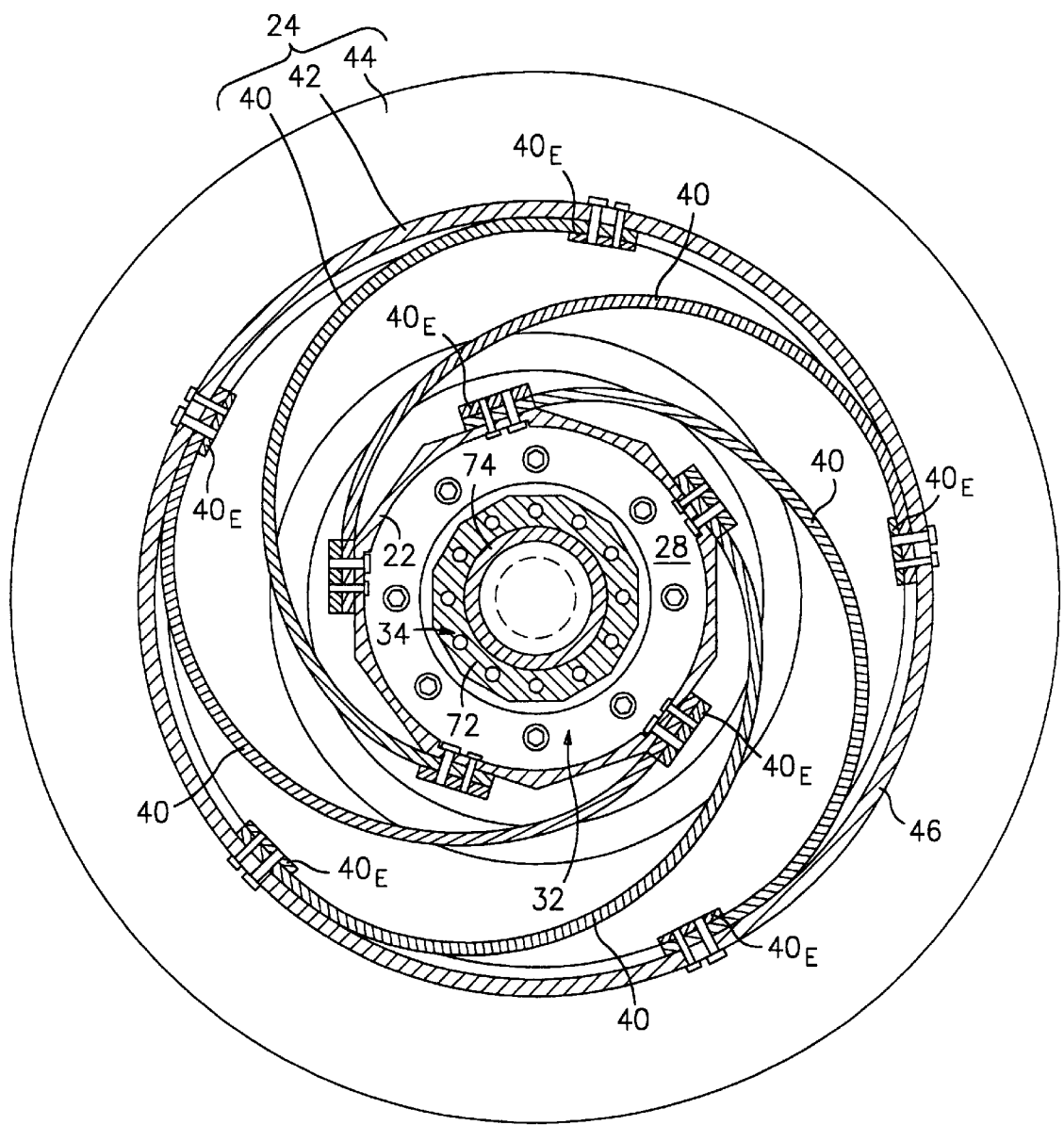
FIG. 4 is a cross-sectional view taken substantially along line 4—4 of FIG. 3.

In FIGS. 3 and 4, the spring-mass system 24 is preferably comprised of a plurality of arcuate spring elements 40, a ring-shaped mass 42 affixed to and supported by the spring elements 40, and an aerodynamic fairing 44 mounting to and rotating with the ring-shaped mass 42. More specifically, five (5) such spring elements 40 are arranged such that the ends $40_E$ thereof are equiangularly spaced about the hub attachment fitting 22 and the ring-shaped mass 42, i.e., 72 degrees apart, and span an arc of about 180 degrees. As such, the spring rate stiffness is substantially symmetric in an in-plane direction. In the described embodiment, each spring element 40 is attached by a series of bolts to the hub attachment fitting 22 and ring-shaped mass 42, though it will be appreciated that any suitable attachment means may be employed.

Figure 5:
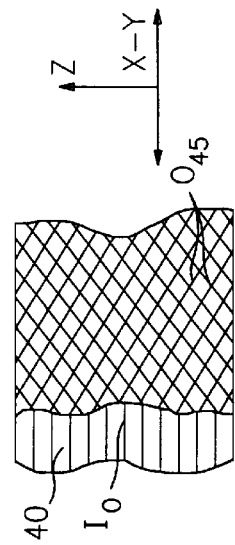
FIG. 5 is a partial schematic view taken substantially along line 5—5 of FIG. 3.

In the preferred embodiment, each arcuate spring element 40 is fabricated from composite material having reinforcing fibers disposed in a binding matrix. More specifically, and referring to FIG. 5, each spring element 40 is comprised of about 30–50% in-plane or 0 degree fibers $I_0$, i.e., parallel to the X-Y plane of the reference coordinate system, and 50–70% out-of-plane or ±45 degree fibers $O_{45}$ relative to X-Y plane. In the preferred embodiment, a high modulus fiber such as graphite (e.g., IM-7/8552 produced by Hexcel, located in Stamford, Conn.) is the reinforcing material for each spring element 40. As such, the spring elements 40 are substantially compliant in an in-plane direction and substantially rigid out-of-plane. In the described embodiment, the spring stiffness is selected so as to produce a 4P in-plane frequency, a yaw frequency of about 3.3P, and a vertical and pitch frequency of between about 5.2P and 5.8P. With respect to the latter, such high vertical and pitch stiffness is required to avoid combined dynamic resonances and react airloads acting on the vibration isolator 20.

As best seen in FIG. 3, the ring-shaped mass 42 is comprised of a central ring 46 and a pair of ring plates 48 which are mounted to the upper and lower ends $46_E$ of the central ring 46 by a series of attachment bolts 50. In the preferred embodiment, each of the ring plates 48 extends inwardly and is coplanar with an outwardly protruding flange or segment 54 of the hub attachment fitting 22. Furthermore, each of the ring plates 48 defines a circular abutment surface 58 which coacts with an opposing abutment surface 56 of the protruding flange 54 to limit the permissible in-plane motion of the ring-shaped mass 42. In the described embodiment, tuning weights 60 may be mounted to the upper and/or lower surfaces of the ring plates 48 to optimally tune the vibration isolator 20.

In the preferred embodiment, the fairing 44 includes an annular segment 64 defining the leading and trailing edge contour of the fairing 44 and a top segment 66 mounting to an upper lip $64_L$ of the annular segment 64 for defining the upper surface contour of the fairing 44. The annular segment 64 is mounted to the ring-shaped mass 42 via the same attachment bolts 50 used for integrating the various segments of the mass 42. In the described embodiment, a V-shaped bracket 68 is interposed between the fairing segments 64, 66 to facilitate the contour of the fairing 44 and to generate support for the structural connection therebetween.

In the preferred embodiment, the fairing 44 constitutes at least about 20% of the "working mass" of the vibration isolator 20. In the context used herein, the "working mass" is that portion of the inertial mass of the vibration isolator 20 which functions to oppose vibrations active on the main rotor 12. In the described embodiment, the vibration isolator includes about 100 lbs. (45.4 kg.) of working mass wherein the fairing 44 contributes about 42 lbs. (19.0 kg.) thereto, the ring-shaped mass contributes about 50 lbs. (22.7 kg.) and the arcuate spring elements 40 contribute about 8 lbs. (3.6 kg.).

In operation, the fairing 44 and ring-shaped mass 42 move in unison, i.e., oscillate in an in-plane direction, to cancel or substantially reduce vibration. Furthermore, the aerodynamic contour of the fairing 44 substantially reduces the profile and induced drag of a baseline, unfaired vibration isolator such as described in the prior art. Additionally, the fairing 44 reduces the turbulence downstream of the vibration isolator and redirects the freestream airflow away from, e.g., over, the tail pylon. As such, the fairing 44 is multifunctional insofar as the fairing 44 comprises a significant portion of the working mass of the vibration isolator 20 while additionally reducing aerodynamic drag and ameliorating handling qualities. It will, therefore, be appreciated that the mass or weight of the fairing 44 is not parasitic, as was its character in the prior art, but is productive by way of its integration with the spring-mass system 24 of the vibration isolator 20.

In addition to the system benefits described above, the vibration isolator 20 accommodates the mounting of other mast-mounted rotor systems, facilitates periodic inspection and maintenance of the main rotor attachment, and produces a compact design envelope for weight efficiency. More specifically, the internal chamber 32 defined by the hub attachment fitting 22 provides an efficient mounting location for hub-mounted systems such as the rotor de-ice distributor 36. Furthermore, the internal chamber 32 provides convenient access to the main rotor attachment means 34 which, in the described embodiment, comprises a conventional mast nut 70 and jacking bolt arrangement 72. As such, an operator may periodically inspect and/or tighten the attachment without removing the vibration isolator 20. Moreover, the large envelope, i.e., the diameter, defined by the hub attachment fitting 22 and relatively close proximity thereof to the ring-shaped mass 42 provides an opportunity to produce an efficient motion limiting means. That is, the spacing therebetween is sufficiently close to configure the ring-shaped mass 42 such that it makes contact with the hub attachment fitting 22 before potentially damaging strain levels are produced in the spring elements 40. As discussed earlier, such motion limiting means 74 comprises the formation of at least one abutment surface 56 on the hub attachment fitting 22, and at least one abutment surface 58 on the ring-shaped mass 42.

Although the invention has been shown and described with respect to exemplary embodiments thereof, it should be understood by those skilled in the art that other changes, omissions and additions may be made therein and thereto, without departing from the spirit and scope of the present invention. For example, while the exemplary embodiments of the present invention have been described in the context of a rotorcraft having an articulated main rotor hub design, it will be appreciated that the teachings described herein are applicable to rotorcraft employing other rotor hub configurations such as teetering, hingeless, or bearingless rotors etc. Furthermore, while the described embodiment depicts a vibration isolator 20 having a plurality of arcuate spring elements 40, it will be appreciated that other spring means may be used. For example, radially oriented coil springs may be substituted therefor to provide the requisite spring stiffness.

Figure 6:
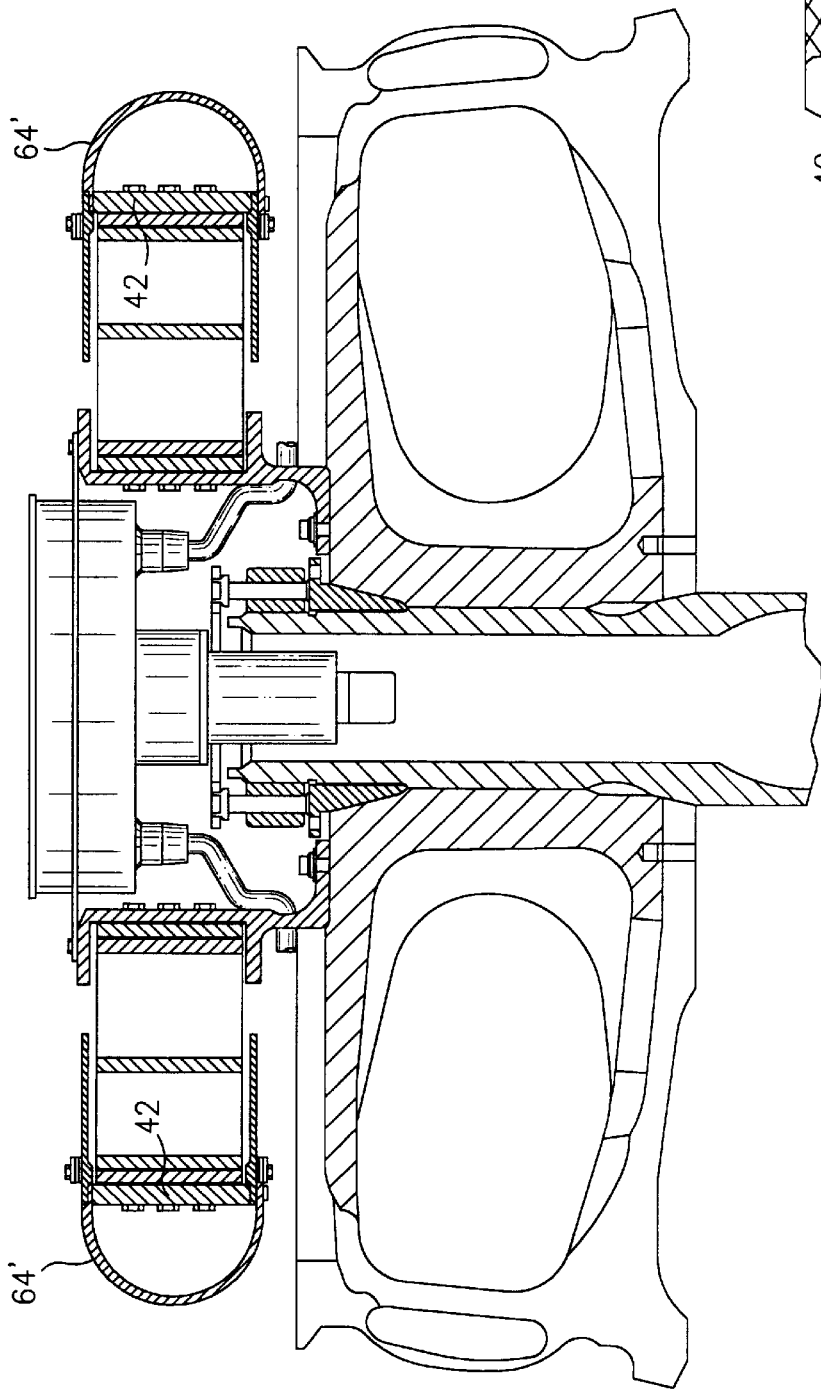
FIG. 6 is a side section view of an alternate embodiment the inventive vibration isolator.

While the vibration isolator 20 of the preferred embodiment includes a multi-segment fairing 44, i.e., a fairing 44 having both annular and top segments 64, 66, it is contemplated that a single annular segment may be sufficient to aerodynamically contour the spring-mass system 24. Such arrangement is shown in FIG. 6 wherein a C-shaped annular segment 64' is mounted in combination with the ring-shaped mass 42.

While the hub attachment fitting 22 is preferably mounted in combination with the hub 30, it is contemplated that the hub attachment fitting may be secured in combination with the main rotor shaft 38 or other intermediate structure. Furthermore, while the described embodiment depicts a multi-segment ring-shaped mass 42, it will be appreciated that the mass may have more or less segments and may have a different geometric shape.

What is claimed is:

1. A vibration isolator (20) operative for reducing vibration active on a main rotor (12) of a rotorcraft, which vibration isolator includes a hub attachment fitting (22) secured in combination with the main rotor (12), the hub attachment fitting (22) having a ring-shaped portion, and a spring-mass system (24) mounting to and rotating with the hub attachment fitting (22), the spring-mass system (24) further defining a working mass, wherein the improvement is characterized by:

said spring-mass system (24) including a ring-shaped mass (42) located radially outward from the hub attachment fitting (22), the ring-shaped mass (42) being attached to the ring-shaped portion of the hub attachment fitting (22) with a plurality of arcuate spring elements (40), and a fairing (44) operative to aerodynamically contour the spring-mass system (24) and to provide a portion of the working mass of the spring-mass system (24) the fairing being to the ring-shaped mass (42) so that the fairing is capable of movement relative to the hub attachment fitting (22).

2. The vibration isolator (20) according to claim 1 wherein said aerodynamic fairing (44) constitutes at least about 20% of the working mass.

3. The vibration isolator (20) according to claim 2 wherein said aerodynamic fairing (44) includes an annular segment (64 or 64').

4. The vibration isolator (20) according to claim 2 wherein said aerodynamic fairing (44) includes an annular segment (64) and a top segment (66).

5. The vibration isolator (20) according to claim 2 wherein said main rotor includes at least one hub-mounted system (36) and wherein said vibration isolator (20) is further characterized by said hub attachment fitting (22) defining an internal chamber (32) adapted for receiving the hub-mounted system (36).

6. The vibration isolator (20) according to claim 2 further including a motion limiting means (74) and being further characterized by said motion limiting means comprising at least one abutment surface (58) formed on the ring-shaped mass (42) of the spring-mass system (24) and at least one abutment surface (56) formed on the hub attachment fitting (22), said abutment surfaces (56, 58) coacting to limit the displacement of the ring-shaped mass (42).

7. The vibration isolator (20) according to claim 6 wherein said aerodynamic fairing (44) includes an annular segment (64) and a top segment (66).

8. The vibration isolator (20) according to claim 1 wherein said aerodynamic fairing (44) includes an annular segment (64 or 64').

9. The vibration isolator (20) according to claim 8 wherein said main rotor includes at least one hub-mounted system (36) and wherein said vibration isolator (20) is further characterized by said hub attachment fitting (22) defining an internal chamber (32) adapted for receiving the hub-mounted system (36).

10. The vibration isolator (20) according to claim 8 further including a motion limiting means (74) and being further characterized by said motion limiting means comprising at least one abutment surface (58) formed on the ring-shaped mass (42) of the spring-mass system (24) and at least one abutment surface (56) formed on the hub attachment fitting (22), said abutment surfaces (56, 58) coacting to limit the displacement of the ring-shaped mass (42).

11. The vibration isolator (20) according to claim 1 wherein said aerodynamic fairing (44) includes an annular segment (64) and a top segment (66).

12. The vibration isolator (20) according to claim 11 wherein said main rotor includes at least one hub-mounted system (36) and wherein said vibration isolator (20) is further characterized by said hub attachment fitting (22) defining an internal chamber (32) adapted for receiving the hub-mounted system (36).

13. The vibration isolator (20) according to claim 11 further including a motion limiting means (74) and being further characterized by said motion limiting means comprising at least one abutment surface (58) formed on the ring-shaped mass (42) of the spring-mass system (24) and at least one abutment surface (56) formed on the hub attachment fitting (22), said abutment surfaces (56, 58) coacting to limit the displacement of the ring-shaped mass (42).

14. The vibration isolator (20) according to claim 1 wherein said main rotor includes at least one hub-mounted system (36) and wherein said vibration isolator (20) is further characterized by said hub attachment fitting (22) defining an internal chamber (32) adapted for receiving the hub-mounted system (36).

15. The vibration isolator (20) according to claim 1 further including a motion limiting means (74) and being further characterized by said motion limiting means comprising at least one abutment surface (58) formed on the ring-shaped mass (42) of the spring-mass system (24) and at least one abutment surface (56) formed on the hub attachment fitting (22), said abutment surfaces (56, 58) coacting to limit the displacement of the ring-shaped mass (42).

16. A vibration isolator (20) operative for reducing vibration active on a main rotor (12) of a rotorcraft, which vibration isolator (20) includes a hub attachment fitting (22) secured in combination with the main rotor (12) and a spring-mass system (24) mounting to and rotating with the hub attachment fitting (22), the spring-mass system (24) further defining a working mass, wherein the improvement is characterized by:

said spring-mass system (24) including a fairing (44) operative to aerodynamically contour the spring-mass system (24) and to provide a portion of the working mass of the spring-mass system (24), said spring-mass system including a ring-shaped mass (42), said aerodynamic fairing (44) mounted to and rotating with said ring-shaped mass (42), and wherein said main rotor (12) is attached to a main rotor shaft (38) by a mounting means (34) and wherein said vibration isolator (20) is further characterized by said hub attachment fitting (22) defining an internal chamber (32) adapted for providing access to the mounting means (34).

17. A vibration isolator (20) operative for reducing vibration active on a main rotor (12) of a rotorcraft which vibration isolator includes a hub attachment fitting (22) secured in combination with the main rotor (12) and a spring-mass system (24) mounting to and rotating with the hub attachment fitting (22), the spring-mass system (24) further defining a working mass, wherein the improvement is characterized by:

said spring-mass system (24) including a fairing (44) operative to aerodynamically contour the spring-mass system (24) and to provide a portion of the working mass of the spring-mass system (24), said spring-mass system including a ring-shaped mass (42), said aerodynamic fairing (44) mounted to and rotating with said ring-shaped mass (42), and wherein said aerodynamic fairing (44) constitutes at least about 20% of the working mass, and wherein said main rotor (12) is attached to a main rotor shaft (38) by a mounting means (34) and wherein said vibration isolator (20) is further characterized by said hub attachment fitting (22) defining an internal chamber (32) adapted for providing access to the mounting means (34).

18. A vibration isolator (20) operative for reducing vibration active on a main rotor (12) of a rotorcraft, which vibration isolator includes a hub attachment fitting (22) secured in combination with the main rotor (12) and a spring-mass system (24) mounting to and rotating with the hub attachment fitting (22), spring-mass system (24) further defining a working mass, wherein the improvement is characterized by:

said spring-mass system (24) including a fairing (44) operative to aerodynamically contour the spring-mass system (24) and to provide a portion of the working mass of the spring-mass system (24), said spring-mass system including a ring-shaped mass (42), said aerodynamic fairing (44) mounted to and rotating with said ring-shaped mass (42), said aerodynamic fairing (44) including an annular segment (64 or 64'), and wherein said main rotor (12) is attached to a main rotor shaft (3 8) by a mounting means (34) and wherein said vibration isolator (20) is further characterized by said hub attachment fitting (22) defining an internal chamber (32) adapted for providing access to the mounting means (34).

19. A vibration isolator (20) operative for reducing vibration active on a main rotor (12) of a rotorcraft, which vibration isolator includes a hub attachment fitting (22) secured in combination with the main rotor (12) and a spring-mass system (24) mounting to and rotating with the hub attachment fitting (22), the spring-mass system (24) further defining a working mass, wherein the improvement is characterized by:

said spring-mass system (24) including a fairing (44) operative to aerodynamically contour the spring-mass system (24) and to provide a portion of the working mass of the spring-mass system (24), said spring-mass system including a ring-shaped mass (42), said aerodynamic fairing (44) mounted to and rotating with said ring-shaped mass (42), said aerodynamic fairing (44) including an annular segment (64 or 64') and a top segment (66), and wherein said main rotor (12) is attached to a main rotor shaft (38) by a mounting means (34) and wherein said vibration isolator (20) is further characterized by said hub attachment fitting (22) defining an internal chamber (32) adapted for providing access to the mounting means (34).

* * * * *